United States Patent [19]

Nakashima et al.

[11] Patent Number: 4,745,158
[45] Date of Patent: May 17, 1988

[54] HIGHLY WATER-ABSORPTIVE OPTICAL MATERIAL

[75] Inventors: Tatsutoshi Nakashima; Nobuyuki Toyoshima; Yasuomi Sasai, all of Nagoya, Japan

[73] Assignee: Toyo Contact Lens Co., Ltd., Nagoya, Japan

[21] Appl. No.: 40,585

[22] Filed: Apr. 21, 1987

[51] Int. Cl.$^4$ .................. C08F 259/08; C08F 265/06
[52] U.S. Cl. ................... 525/276; 351/160 H; 523/106; 525/283; 525/293; 525/296; 525/301; 525/305; 525/307; 525/937
[58] Field of Search ............... 523/106; 525/276, 283, 525/293, 296, 301, 305, 307; 351/160 H

[56] References Cited

U.S. PATENT DOCUMENTS 3,947,401 3/1976 Stamberger .................... 523/106
3,988,274 10/1976 Masuhara et al. ............... 523/106

FOREIGN PATENT DOCUMENTS 0129840 1/1985 European Pat. Off. .
0158478 10/1985 European Pat. Off. ............ 525/305
2342510 9/1977 France .
62-021101 1/1987 Japan .
2157300 10/1985 United Kingdom .

*Primary Examiner*—Jacob Ziegler
*Attorney, Agent, or Firm*—Oblon, Fisher, Spivak, McClelland & Maier

[57] ABSTRACT

A highly water-absorptive optical material obtained by saponification for hydrophilic treatment of a copolymer composed essentially of:

(A) from 2 to 30 parts by weight of a (meth)acrylate polymer having at least one polymerizable group per molecule on an average obtained by copolymerizing (a) at alkyl (meth)acrylate monomer and (b) a monomer having at least two polymerizable groups per molecule, as the main components, and (B) from 70 to 98% by weight of a fatty acid vinyl ester.

12 Claims, No Drawings

HIGHLY WATER-ABSORPTIVE OPTICAL MATERIAL

The present invention relates to a novel highly water-absorptive optical material. More particularly, it relates to a highly water-absorptive optical material suitable particularly for medical applications, such as a material for contact lenses or a material for artificial cornea.

In recent years, an attention has been drawn to a substance-permeable material as the application of polymer materials to the field of medical materials has been advanced. In particular, an attention has been drawn to a gas-permeable material for an optical material for medical applications, such as a contact lens material and an artificial cornea material.

Among various requirements for the contact lens material, the gas permeability, particularly, the oxygen permeability, is one of the most important requirements. Because, it is necessary to supply an adequate amount of oxygen through the contact lens material to the cornea so that the metabolic function of the corneal tissues will not be hindered.

In order to improve the gas permeability, the following methods have been proposed.

(1) A method in which a material known to have excellent gas permeability, such as a silicone rubber material, is employed as the contact lens material.

(2) A method wherein a copolymer composed essentially of a silicon-containing monomer known as a gas-permeable monomer, such as a siloxanylalkyl (meth)acrylate monomer, is used as the contact lens material.

(3) A method wherein the water-content of the material is increased so that the gas-permeability is improved by utilizing the behavior of water contained in the material.

The method (1) has a difficulty relating to the water repellency inherent to the silicone rubber material. For instance, when used as a contact lens material, it exhibits poor affinity to the corneal surface or to tears, and lipophilic stains are likely to adhere on its surface, whereby it is likely to give a damage to the corneal tissues, or the lens material is likely to have white turbidity.

According to the method (2), it is possible to obtain a material having excellent gas-permeability. However such a material is hard material in most cases. Therefore, when used as a contact lens, it tends to give an uncomfortable feeling to the wearer, or it is likely to give a damage to the corneal tissues.

According to the method (3), the material softens upon absorption of water, whereby it gives a comfortable feeling to the wearer, and it is possible to increase the gas-permeability by increasing the water content.

Many of such highly water-absorptive material have excellent permeability for a gas such as oxygen by means of water absorbed in the material. Therefore, when used as contact lenses, they are capable of supplying an adequate amount of oxygen physiologically requried for the cornea, from the atmosphere to the cornea by means of the water contained in the material, and thus they are highly safe to the eyes from the physiological viewpoint.

While such materials have excellent properties as mentioned above, they have difficulties in that since they have a high water content, the mechanical strength upon absorption of water is extremely low, and when formed into shaped products, they are susceptible to breakage, and thus have a problem in the durability.

In the field of medical materials, an attempt has been made to obtain a mechanically reinforced material by the copolymerization of a hydrophilic monomer such as vinyl pyrrolidone and a polymer having polymerizable groups, as essential components, in order to solve the problem in the durability, particularly the problem in the mechanical strength, while satisfying the high water-absorptive property.

The material composed essentially of viny pyrrolidone can be made to have a high water content at a level of about 80%. However, if the water content approaches to the level of about 80%, the mechanical strength tends to be still low and the durability is not still satisfactory for use as the above-mentioned optical material. Thus, there still remains the problem unsolved.

On the other hand, Japanese Examined Patent Publication Nos. 49222/1982 and 15647/1985 disclose materials composed essentially of polyvinyl alcohols.

Japanese Examined Patent Publication No. 49222/1982 is concerned with a shaped product for medical use made of a modified polyvinyl alcohol obtained by copolymerizing a vinyl ester with a hydrophobic monomer having a high molecular weight at a level of from 1,000 to 10,000 and containing a polymerizable double bond at its terminal, followed by saponification.

Japanese Examined Patent Publication No. 15647/1985 is concerned with a process for producing a chemically-bonded, phase-separated and spontaneously cured hydrophilic thermoplastic graft copolymer obtained by copolymerizing a hydrophobic polymerizable monomer having a large molecular weight (linear polymer) with at least one hydrophilic copolymerizable comonomer.

However, in the materials disclosed in the above two publications, a high molecular weight hydrophobic monomer or linear polymer (hereinafter referred to as a "macromonomer") having a polymerizable double bond only at one terminal end of the polymer chain, is employed, and if such a macromonomer is polymerized with a vinyl ester or with a hydrophilic copolymerizable comonomer, the resulting copolymer will contain a substantial amount of the non-polymerized macromonomer since the macromonomer has a low concentration of polymerizable groups, and if the non-polymerized macromonomer is not adequately removed by purification, a macro phase-separation is likely to occur in the material upon absorption of water, whereby it is likely that a transparent material is hardly obtainable, although the mechanical strength may be improved to some extent by the physical cross-linking owning to intertwining of the copolymer chains to one another. Further, in such polymerization, no substantial chemical cross-linking takes place, whereby there will remain various problems with respect to the dimensional stability, the insolubility (solvent resistance) against various solvents, the durability such as boiling resistance for heat sterilization, etc.

For such reasons, the materials made of such macromonomers are not suitable for use as optical materials for medical applications. Further, Japanese Examined Patent Publication No. 49222/1982 discloses no specific application of the optical material.

Furthermore, the macromonomers disclosed in the above two publications, are prepared by living anion polymerization, whereby the operation for this polymerization reaction is cumbersome, and the production efficiency of such macromonomers is very poor. Therefore, it is extremely difficult to produce the material inexpensively in a large amount on an industrial scale.

Under the circumstances, it has been desired to develop a highly water-absorptive optical material which has a high water content at a level of about 80% or higher and which, nevertheless, has excellent transparency and adequate durability with satisfactory mechanical strength, dimensional stability, solvent resistance and boiling resistance, and which can readily be prepared with high production efficiency.

In view of the above-mentioned problems of the conventional techniques, the present inventors have conducted extensive researches with an aim to provide a readily producible optical material suitable for medical applications, which is superior to the conventional water-absorptive materials in the water-absorptivity and gas-permeability and which at the same time has excellent transparency and excellent durability such as mechanical strength, dimensional stability, solvent resistance and boiling resistance. As a result, they have found a highly water-absorptive optical material which satisfies the above object, and the present invention has been accomplished on the basis of the discovery.

The present invention provides a highly water-absorptive optical material obtained by saponification for hydrophilic treatment of a copolymer composed essentially of:

(A) from 2 to 30 parts by weight of a (meth)acrylate polymer having at least one polymerizable group per molecule on an average obtained by copolymerizing (a) an alkyl (meth)acrylate monomer and (b) a monomer having at least two polymerizable groups per molecule, as the main components, and (B) from 70 to 98% by weight of a fatty acid vinyl ester.

The (meth)acrylate polymer as defined above under (A) may hereinafter be referred to simply as the polymer (A). Likewise, the fatty acid vinyl ester under (B) may hereinafter be referred to simply as the monomer (B). In this specification, the term "(meth)acrylate" represents an acrylate and a methacrylate. Likewise, the term "(meth)acrylic acid" represents acrylic acid and methacrylic acid.

The polymer (A) in the present invention contains at least one polymerizable group per molecule on an average, and thus is efficiently copolymerizable with a monomer having a polymerizable group, such as the monomer (B). Especially when the polymer (A) has at least two polymerizable groups, chemical cross-linking will be formed by the copolymerization with a monomer having a polymerizable group, such as the monomer (B), and the number of chemical cross-linking sites increases with an increase of the number of polymerizable groups, whereby it is possible to obtain an optical material which undergoes no macro phase-separation upon absorption of water and which has excellent transparency and durability such as mechanical strength, solvent resistance, dimensional stability and boiling resistance.

The polymer (A) can readily be obtained by copolymerizing an alkyl (meth)acrylate monomer (hereinafter referred to simply as a component (a)) and a monomer having at least two polymerizable groups per molecule (hereinafter referred to simply as a component (b)), as the main components.

The component (a) is an alkyl (meth)acrylate monomer in which the alkyl group is a straight chain, branched chain or cyclic alkyl group or such an alkyl group with hydrogen atoms substituted by halogen atoms such as fluorine. Specific examples include alkyl (meth)acrylates such as methyl (meth)acrylate, ethyl (meth)acrylate, propyl (meth)acrylate, butyl (meth)acrylate, pentyl (meth)acrylate, hexyl (meth)acrylate, dodecyl (meth)acrylate, cyclohexyl (meth)acrylate, trifluoroethyl (meth)acrylate and pentafluoropropyl (meth)acrylate. These alkyl (meth)acrylates may be used alone or in combination as a mixture of two or more different kinds.

As the component (a), it is preferred to employ a lower alkyl (meth)acrylate, since it is thereby possible to conduct the copolymerization of the polymer (A) made of such a component (a) with a monomer having a polymerizable group, such as the monomer (B), without bringing about a steric hindrance.

Specific examples of the component (b) include monomers having at least two polymerizable groups per molecule, such as allyl (meth)acrylate, vinyl (meth)acrylate, ethylene glycol di(meth)acrylate, diethylene glycol di(meth)acrylate, triethylene glycol di(meth)acrylate and dipropylene glycol di(meth)acrylate. These monomers may be used alone or in combination as a mixture of two or more different kinds.

It is preferred to suitably select the component (b) by taking into consideration the copolymerizability of the polymerizable group of the polymer (A) made of the component (b) with the polymerizable group of the other copolymerizable monomer such as the monomer (B). Because, for instance, the copolymerizability differs between a vinyl group and a (meth)acryloyl group or between an allyl group and a (meth)acryloyl group, and if such polymerizable groups having different copolymerizability are copolymerized, the copolymerization will be incomplete, thus leading to phase-separation, whereby the resulting material will be opaque. Further, the material can not thereby be strengthened, whereby it is impossible to obtain a material having adequate durability such as mechanical strength, dimensional stability, solvent resistance and boiling resistance.

From such a viewpoint, it is necessary to use as the component (b) a monomer having a vinyl-type polymerizable group such as an allyl group or a vinyl group, e.g. allyl (meth)acrylate or vinyl (meth)acrylate, in order to ensure satisfactory copolymerization of the polymer (A) with the monomer (B) having a vinyl-type polymerizable group. In a case where a monomer having a (meth)acryloyl group is used in combination, as a monomer other than the monomer having a vinyl-type polymerizable group, such as the monomer (B), it is preferred to use as the component (b) a combination of a vinyl-type polymerizable group-containing (meth)acrylate monomer and a (meth)acrylate monomer having at least two (meth)acryloyl groups.

Further, for the copolymerization of the polymer (A) with the monomer (B), etc., a hydrophilic group-containing (meth)acrylate monomer (hereinafter referred to simply as a component (c)) may be incorporated as a component for the polymer (A). By using the component (c), the compatibility of the polymer (A) with other hydrophilic monomers will be improved, whereby it is possible to obtain a uniform highly water-absorptive optical material, and a transparent material can more efficiently be obtained without bringing about macro phase-separation.

The component (c) is a hydrophilic group-containing (meth)acrylate monomer having a hydrophilic group selected from the group consisting of an alkoxypolyalkylene glycol residue, an amido group, an N-substituted amido group, an amino group, an N-substituted amino group, a carboxyl group, a hydroxyl group and a polyalkylene glycol residue. Specific examples of the component (c) includes an alkoxypolyalkylene glycol mono(meth)acrylate such as methoxydiethylene glycol mono(meth)acrylate, methoxytriethylene glycol mono(meth)acrylate or methoxydipropylene glycol mono(meth)acrylate; (meth)acrylamide; an N-mono-substituted (meth)acrylamide such as N-methyl (meth)acrylamide, N-ethyl (meth)acrylamide or N-hydroxyethyl (meth)acrylamide; an N,N-di-substituted (meth)acrylamide such as N,N-dimethyl (meth)acrylamide, N,N-diethyl (meth)acrylamide or N-ethyl-N-aminoethyl (meth)acrylamide; a (meth)acryloyloxyalkylamine such as (meth)acryloyloxyethylamine; an N-mono-substituted (meth)acryloyloxyalkylamine such as N-methyl (meth)acryloyloxyethylamine; an N,N-disubstituted (meth)acryloyloxyalkylamine such as N,N-dimethyl (meth)acryloyloxyethylamine; (meth)acrylic acid; and a hydroxyl group-containing (meth)acrylate such as hydroxyethyl (meth)acrylate, hydroxypropyl (meth)acrylate, hydroxybutyl (meth)acrylate, dihydroxypropyl (meth)acrylate, dihydroxybutyl (meth)acrylate, diethylene glycol mono(meth)acrylate, triethylene glycol mono(meth)acrylate or dipropylene glycol mono(meth)acrylate. These monomers may be used alone or in combination as a mixture of two or more different kinds.

The composition of the polymer (A) i.e. the amount of polymerizable groups or in some cases the amount of hydrophilic groups, may be controlled by adjusting the amounts of the respective components for the preparation of the polymer (A) to be used in the present invention. In the present invention, the polymer (A) is preferably prepared by copolymerizing from 65 to 99.95 mol parts of the alkyl (meth)acrylate monomer (a), from 0.05 to 5 mol parts of the monomer (b) and from 0 to 30 mol parts of the hydrophilic group-containing (meth)acrylate monomer (c), with the total amount of the monomers (a), (b) and (c) being 100 mol parts, in order to obtain a material having excellent reinforcing effect and transparency.

However, in a case where a hydroxyl group-containing (meth)acrylate such as hydroxyethyl (meth)acrylate or hydroxybutyl (meth)acrylate is used as the component (c), an ester exchange reaction is likely to take place during the polymerization reaction for the preparation, whereby the amount of the (meth)acryloyl group in the polymer (A) tends to increase, and it is not desirable to use such a hydroxyl group-containing (meth)acrylate excessively, and the amount is preferably not higher than 15 mol parts.

The polymer (A) useful for the present invention can efficiently be obtained by copolymerizing the above components (a) and (b) optionally together with the component (c). However, it is necessary to control the polymerization condition so that not all of the polymerizable groups in the component (b) used for introducing the polymerizable groups are subjected to copolymerization (or the cross-linking reaction). For this reason, a solution polymerization is preferably employed as the polymerzation method for the preparation of the polymer (A). As a solvent for the solution polymerization, any solvent may be employed so long as it is capable of dissolving the monomer components and it does not adversely affect the polymerization. As such a solvent, benzene or acetone may be mentioned. These solvents may be used alone or in combination as a mixture of two or more different kinds. The amount of the solvent used varies depending upon the reaction condition, and may be suitably adjusted as the case requires. The reaction temperature and the reaction time are interrelated, and such reaction conditions can not generally be defined. However, from the practical viewpoint, the copolymerization reaction is preferably conducted at a relatively low temperature (from 50° to 80° C.) for from a few minutes to a few hours.

For the polymerization, a usual polymerization initiator, such as azobisisobutyronitrile, azobisdimethylvaleronitrile, t-butylhydroperoxide, cumene hydroperoxide or benzoylperoxide, may be employed. The initiator is used usually in an amount of from about 0.001 to about 5 mol parts, preferably from about 0.05 to about 3 mol parts, relative to 100 mol parts of the total amount of all the components used for the preparation of the polymer (A).

The number average molecular weight of the polymer (A) thus prepared, is within a range of from about 5,000 to 200,000. The molecular weight of the polymer (A) affects e.g. the mechanical strength of the highly water-absorptive optical material which will be obtained. Namely, the larger the molecular weight, the greater the reinforcing effect of the polymer (A) and the better the mechanical strength of the material thereby obtained. On the other hand, if the molecular weight is too large, it becomes difficult to uniformly mix the polymer (A) with the other monomer when the polymer (A) is to be copolymerized with a hydrophilic monomer such as the monomer (B). For these reasons, the preferred range of the number average molecular weight is from about 10,000 to about 100,000.

When the proportion of the polymerizable group in the polymer (A) is represented by the number of polymerizable groups, the number of polymerizable groups is at least one per molecule of the polymer (A) on an average, to obtain the reinforcing effect of the polymer (A). When the number average molecular weight of the polymer (A) is within a range of from 10,000 to 100,000, the average number of polymerizable groups is preferably from 1 to 5 per molecule of the polymer (A). If the average number of polymerizable groups exceeds this range, it is likely that during the polymerization with a monomer such as the monomer (B), the chemical cross-linking density of the resulting material tends to be unnecessarily high, or the water content tends to be low, whereby it becomes difficult to obtain a desirable high water content, or the material tends to be brittle.

In order to attain satisfactory copolymerization of the polymer (A) and the monomer (B) as the main components, the number of free polymerizable groups in the polymer (A) is preferably selected to satisfy the condition of (number of vinyl-type polymerizable groups/number of (meth)acryloyl-type polymerizable groups)$\geq 1$.

The polymer (A) to be used in the present invention includes a compound represented by the formula:

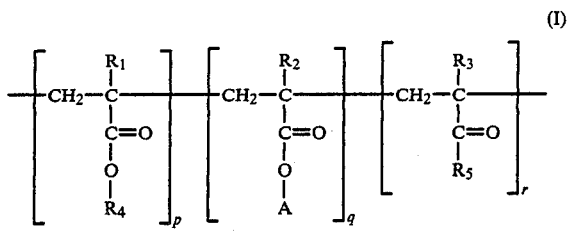

(I)

wherein each of $R_1$, $R_2$ and $R_3$ which may be the same or different, is a hydrogen atom or a methyl group, $R_4$ is an alkyl group, A is a polymerizable group selected from the group consisting of an allyl group, a vinyl group and a (meth)acryloyl group, $R_5$ is a hydrophilic group, and p, q and r are integers satisfying $0.002 \leq q/(p+q+r) \leq 0.05$ and $0 \leq r/(p+q+r) \leq 0.3$.

According to the method described above, the components (a) and (b) are used optionally together with the component (c) for the preparation of the polymer (A) to be used in the present invention. However, the copolymerizable groups may be introduced into the polymer (A) in accordance with the following methods without using the component (b).

(1) The component (a) is copolymerized optionally together with the component (c), with an epoxy group-containing (meth)acrylate such as glycidyl (meth)acrylate, followed by the reaction with a compound having a polymerizable group and being reactive with the epoxy group, such as (meth)acrylic acid or hydroxy styrene, to introduce the polymerizable group.

(2) The component (a) is copolymerized with a hydroxyl group-containing alkyl (meth)acrylate as described as the component (c), followed by the reaction with a desired amount of (meth)acrylic acid chloride to introduce a polymerizable group.

(3) (Meth)acrylic acid is copolymerized with the component (a) optionally together with the component (c), followed by the reaction with a compound having an epoxy group and a polymerizable group, such as glycidyl (meth)acrylate, to introduce the polymerizable group.

The above methods (1) to (3) are all two step reactions. With a view to preparing the polymer (A) useful for the present invention efficiently on an industrial scale, it is most preferred to employ a method wherein the polymer is obtainable in a single step reaction i.e. the above-mentioned method wherein a mixture comprising the components (a) and (b) is copolymerized optionally together with the component (c).

The polymer (A) thus prepared, is colorless and transparent in a state dissolved in a solvent, and is white powder in a dried state.

To obtain a highly water-absorptive optical material of the present invention, the polymer (A) prepared in the above-mentioned manner, is polymerized with the monomer (B) i.e. a fatty acid vinyl ester, etc.

The monomer (B) is a vinyl ester of a fatty acid. The hydrogen atoms in the fatty acid may be substituted by halogen atoms such as fluorine atoms or chlorine atoms. Specific examples of the monomer (B) include vinyl formate, vinyl acetate, vinyl propionate, vinyl butyrate, vinyl stearate, vinyl monochloroacetate, vinyl trifluoroacetate and vinyl trichloroacetate. These vinyl esters may be used alone or in combination as a mixture of two or more different kinds. When the efficiency for the hydrophilic treatment by saponification is taken into account, it is preferred to employ a lower fatty acid vinyl ester. It is usually preferred to employ vinyl acetate or vinyl trifluoroacetate as a typical material which is readily available.

In the present invention, the polymer (A) and the monomer (B) are used in such proportions that when the total amount of the polymer (A) and the monomer (B) is 100 parts by weight, the polymer (A) is from 2 to 30 parts by weight, preferably from 3 to 20 parts by weight, and the monomer (B) is from 70 to 98 parts by weight, preferably from 80 to 97 parts by weight. If the proportion of the polymer (A) is less than 2 parts by weight, no adequate reinforcing effect of the polymer (A) to the highly water-absorptive optical material of the present invention, can be obtained. On the other hand, if the proportion exceeds 30 parts by weight, it tends to be difficult to maintain the high water content.

For the preparation of the copolymer of the present invention, a part of the monomer (B) may be substituted by any other usual hydrophilic monomer (hereinafter referred to simply as a monomer (C)) as the case requires.

Specific examples of the monomer (C) include a polymerizable group-containing lactam such as N-vinyl pyrrolidone or α-methylene-N-methyl pyrrolidone; an alkoxypolyalkylene glycol mono(meth)acrylate such as methoxydiethylene glycol mono(meth)acrylate, methoxytriethylene glycol mono(meth)acrylate or methoxydipropylene glycol mono(meth)acrylate; (meth)acrylamide; an N-mono-substituted (meth)acrylamide such as N-methyl (meth)acrylamide, N-ethyl (meth)acrylamide or N-hydroxyethyl (meth)acrylamide; an N,N-di-substituted (meth)acrylamide such as N,N-dimethyl (meth)acrylamide, N,N-diethyl (meth)acrylamide or N-ethyl-N-aminoethyl (meth)acrylamide; a (meth)acryloyloxyalkylamine such as (meth)acryloyloxyethylamine; an N-mono-substituted (meth)acryloyloxyalkylamine such as N-methyl (meth)acryloyloxyethylamine; an N,N-di-substituted alkylamine such as N,N-dimethyl (meth)acryloyloxyethylamine; (meth)acrylic acid; and a hydroxyl group-containing (meth)acrylate such as hydroxyethyl (meth)acrylate, hydroxypropyl (meth)acrylate, hydroxybutyl (meth)acrylate, dihydroxypropyl (meth)acrylate, dihydroxybutyl (meth)acrylate, diethylene glycol mono(meth)acrylate, triethylene glycol mono(meth)acrylate or dipropylene glycol mono(meth)acrylate. These monomers may be used alone or in combination as a mixture of two or more different kinds.

The proportion of the monomer (C) to the monomer (B) is preferably not higher than about 20 parts by weight relative to 100 parts by weight of the total amount of the monomers (B) and (C), in order to maintain the high water content of the material to be obtained. When the monomer (C) is incorporated, the proportion of the polymer (A) to the 100 parts by weight of all the comonomers, should be maintained within a range of from 2 to 30 parts by weight, preferably from 3 to 20 parts by weight, for the above-mentioned reasons.

For the preparation of the copolymer as the optical material of the present invention, a usual bulk polymerization method is preferably employed to obtain the material under high production efficiency. If necessary, a solution polymerization method may be employed.

In either method of polymerization, the temperature raising method is preferably such that the polymerization is conducted at a temperature of from about 40° to about 50° C. for from several hours to several tens hours, and then the temperature is gradually raised to about 120° C. over a period of about 10 hours to complete the polymerization.

For the copolymerization, a polymerization initiator similar to the polymerization initiator used for the preparation of the polymer (A) is used in an amount of from about 0.001 to about 5 parts by weight, preferably from about 0.01 to 2 parts by weight, relative to 100 parts by weight of the total amount of all the comonomers.

The shaping may be conducted by a conventional method. For example, an article having a desired shape may be prepared by conducting the above-mentioned polymerization in a mold having a mold cavity corresponding to the desired shape. If necessary, the molded product may further be subjected to mechanical finishing treatment. Otherwise, a block-, plate- or rod-shaped product is prepared by conducting the polymerization in a suitable mold or container, and then shaped into an article of a desired shape by mechanical processings such as cutting, grinding and polishing.

As the resulting copolymer is soft, it is suitable to employ a method wherein a mixture obtained by mixing the monomers, is filled into a mold having a mold cavity having a shape corresponding to the shape of the desired article, whereupon the polymerization and shaping are simultaneously conducted.

The mold to be used may be made of a plastic material or a metal such as bronze which is durable under the working conditions such as heat and solvent. Such a material may be formed into a concave mold and a convex mold having an internal shape corresponding to the shape of a desired article, by injection molding or by mechanical processings such as cutting, grinding and polishing.

The copolymer obtained by the copolymerization reaction, is then subjected to saponification for hydrophilic treatment, to obtain a highly water-absorptive optical material.

Here, the saponification means treatment of the units derived from the fatty acid vinyl ester in the copolymer with an alkaline compound in accordance with a conventional saponification method for a polyvinyl ester or polyvinyl ether to convert the units into an alcohol.

The alkaline compound useful for the saponification is a hydroxide of ammonia, an alkali metal or an alkaline earth metal. For example, ammonium hydroxide, sodium hydroxide, potassium hydroxide or calcium hydroxide may be used. These alkaline compounds are usually solid. Therefore, they are usually dissolved in alcohols or ethers so that they are used for the saponification reaction in the form of alkaline solutions.

The alcohols include methanol, ethanol, propyl alcohol and butyl alcohol. The ethers include diethyl ether and tetrahydrofuran.

The saponification is conducted by immersing the above-mentioned copolymer in the alkaline solution.

The reaction temperature for the saponification is usually within a range of from 0° to 100° C., preferably from 10° to 60° C. If necessary, the reaction may be conducted at a temperature outside the above temperature range. The reaction time for the saponification varies depending upon the type of the alkaline compound, the concentration of the alkaline compound and the reaction temperature for the saponification, and can not generally be defined. For the practical operation, however, the type and the concentration of the alkaline compound are preferably selected so that the saponification reaction can be completed at room temperature in a few hours. Further, the saponification reaction can be conducted in a heterogeneous system.

In the case of a copolymer wherein a readily saponifiable fatty acid vinyl ester such as vinyl formate, vinyl monochloroacetate, vinyl trifluoroacetate or vinyl trichloroacetate is used, the saponification can be conducted under a relatively mild condition, and it is possible to selectively saponify the units derived from such a fatty acid vinyl ester without decomposing other ester bonds or ether bonds in the copolymer.

Namely, for instance, when vinyl acetate is saponified, it is common to conduct the saponification by using a relatively strong alkaline solution such as a methanol solution of sodium hydroxide. Whereas, when vinyl trifluoroacetate is saponified, the saponification can be conducted with a relatively weak alkaline solution such as a methanol solution of ammonium hydroxide.

The copolymer thus saponified is then subjected to boiling treatment in a physiological sodium chloride aqueous solution (a 0.9% sodium chloride aqueous solution) for a few hours to obtain a swelled highly water-absorptive optical material which is safe to living bodies.

Now, the highly water-absorptive optical material of the present invention will be described in further detail with reference to Examples. However, it should be understood that the present invention is by no means restricted to such specific Examples.

REFERENCE EXAMPLE 1

Preparation of a (meth)acrylate polymer having at least one polymerizable group per molecule on an average (polymer (A))

Into a three-necked round bottom flask, 95 g of methyl methacrylate, 0.93 g of allyl methacrylate, 0.49 g of ethylene glycol dimethacrylate, 5 g of hydroxybutyl methacrylate, 1.3 g of azobisisobutyronitrile as a polymerization initiator and 600 ml of benzene as a solvent, were added, and polymerized under stirring at 70° C. for 1.5 hours. Then, the polymerization solution was poured into n-hexane, and the copolymer precipitated was collected and dried under reduced pressure. The copolymer was further dissolved in benzene, and then poured into a large amount of n-hexane, whereby it was again precipitated for purification. The precipitates were collected and dried under reduced pressure to obtain a polymer (A).

The number average molecular weight, the molecular weight distribution and the average number of polymerizable groups per molecule of the polymer (A) thus obtained, were measured in accordance with the following methods. The results are shown in Table 1 together with the yield.

Number average molecular weight

Measured by gel permeation chromatography.

Molecular weight distribution

The weight average molecular weight ($\overline{Mw}$) was measured in the same manner as in the case of the above number average molecular weight ($\overline{Mn}$), and the molecular weight distribution was calculated in accordance with the following equation.

Molecular weight distribution = $\overline{Mw}/\overline{Mn}$

Average number of polymerizable groups per molecule

Measured by gel permeation chromatography and Fourier's conversion proton nuclear magnetic resonance spectrum.

REFERENCE EXAMPLES 2 to 8

In the same manner as in Reference Example 1, various polymers (A) were prepared with the components and the proportions as identified in Table 1.

The number average molecular weight, the molecular weight distribution and the average number of polymerizable groups per molecule of each polymer (A) thus prepared were measured in the same manner as in Reference Example 1. The results are shown in Table 1 together with the yield.

highly water-absorptive optical material in the form of a swelled water-containing gel.

Various properties (the transparency upon absorption of water, the boiling resistance, the solvent resistance, the water content, the penetration resistance, the elongation and the strength index) of the film material thus obtained was measured as follows. The results are shown in Table 2.

Transparency upon absorption of water

The outer appearance of the test specimen film upon absorption of water to the equilibrium state was visually observed with naked eyes.

Boiling resistance

The test specimen film was boiled in a 0.9% sodium chloride aqueous solution for 2 hours and observed to

TABLE 1

| | Reference Example No. | 1 | 2 | 3 | 4 | 5 | 6 | 7 | 8 |
|---|---|---|---|---|---|---|---|---|---|
| Proportions (mol parts) | MMA (*1) | 95.82 | 94.25 | 90.75 | 99.25 | 95.39 | 91.44 | 99.25 | 99.13 |
| | AMA (*2) | 0.74 | 0.50 | 0.75 | 0.75 | 0.75 | 0.74 | 0.50 | 0.75 |
| | EDMA (*3) | 0.25 | 0.25 | | | | | 0.25 | 0.12 |
| | DMAA (*4) | | 5.00 | | | | | | |
| | HEMA (*5) | | | | | 3.86 | 7.82 | | |
| | HBMA (*6) | 3.19 | | | | | | | |
| | EGMA (*7) | | | 8.50 | | | | | |
| | AIBN (*8) | 0.83 | 0.80 | 0.86 | 0.81 | 0.82 | 0.83 | 0.81 | 0.81 |
| | Yield (%) | 40 | 39 | 43 | 38 | 35 | 30 | 46 | 39 |
| Physical properties | Number average molecular weight ($\times 10^{-4}$) | 3.1 | 3.0 | 2.6 | 2.3 | 2.8 | 2.1 | 2.4 | 2.3 |
| | Molecular weight distribution | 2.1 | 2.6 | 1.8 | 1.8 | 1.8 | 1.9 | 2.4 | 2.1 |
| | Average number of polymerizable groups (*9) | | | | | | | | |
| | [A](*10) | 1.2 | 0.7 | 1.2 | 1.3 | 1.4 | 1.4 | 0.8 | 1.2 |
| | [E](*11) | 1.1 | 0.8 | — | — | 1.0 | 1.6 | 0.9 | 0.5 |

Notes:
*1: Methyl methacrylate,
*2: Allyl methacrylate,
*3: Ethylene glycol dimethacrylate,
*4: Dimethylacrylamide,
*5: Hydroxyethyl methacrylate,
*6: Hydroxybutyl methacrylate,
*7: Diethylene glycol monomethacrylate,
*8: Azobisisobutyronitrile,
*9: Average number of polymerizable groups per molecule of the polymer (A) ([A] + [E] ≧ 1)
*10: Allyl group,
*11: Methacryloyl group EXAMPLES 1 to 10

A spacer frame (thickness: 0.2 mm) made of Teflon (trademark) was sandwiched by a pair of glass plates (100×25 mm) covered with a polyester sheet, to form a container. Into this container, a liquid mixture for copolymerization comprising vinyl acetate as the fatty acid vinyl ester, the polymer (A) prepared in one of Referece Examples 1 to 8 and the polymerization initiator in the proportions as identified in Table 2, was introduced, and polymerized in a constant temperature tank at 50° C. for 24 hours. Then, the temperature was gradually raised to 110° C. to complete the polymerization.

After the completion of the polymerization, the copolymer in the form of a film thus obtained, was peeled off from the glass plates covered with a polyester sheet. A test specimen (13 mm in diameter) was punched out from this film.

The test specimen was immersed in a methanol solution of 0.25N sodium hydroxide at room temperature for 2 hours for saponification for hydrophilic treatment. The saponified test specimen was boiled in a 0.9% sodium chloride aqueous solution for 2 hours to obtain a see if it was dissolved.

Solvent resistance

The test specimen film was immersed in a dimethyl sulfoxide solvent and heated to 80° C., and observed to see if it was dissolved.

Water content

The water content was determined in accordance with the following equation.

Water content(%) = $W - W_0/W \times 100$ where W is the weight (g) of the test specimen film upon absorption of water to the equilibrium state, and $W_0$ is the weight (g) of the test specimen film in a dried state.

Penetration resistance

By means of an Instron type compression tester, a pressing needle having a diameter of 1/16 inch was pressed against the center of the test specimen film (thickness: about 0.2 mm) upon absorption of water to the equilibrium state, and the load (g) at the time of the breakage of the test specimen film was measured.

Elongation

The elongation (%) at the time of the breakage of the test specimen film in the above-mentioned measurement of the penetration resistance, was measured.

Strength index

The mechanical strength of the material depends on both the elongation (%) and the penetration resistance (g), and when the product of the elongation (%) and the penetration resistance (g) exceeds 10,000, the material can be regarded as having adequate strength. Therefore, as an index for relative strength, the strength index was calculated in accordance with the following equation.

$$\text{Strength index} = \frac{\text{Penetration resistance (g)} \times \text{Elongation (\%)}}{2 \times \text{Film thickness (}\mu\text{m)}}$$

film were measured in the same manner as in Example 1. The results are shown in Table 2.

When the material of Comparative Example 1 having substantially the same level of water content is compared with the material of Example 1 in the physical properties, it is seen that in Example 1, the penetration resistance is 236, and the strength index is 214, whereas in Comparative Example 1, the penetration resistance is 122 and the strength index is 21.1. This means that the material of Example 1 is superior to the material of Comparative Example 1 by about 2 times in the penetration resistance and about 10 times in the strength index.

The material of Example 3 has penetration resistance corresponding to the penetration resistance of Comparative Example 1. However, the water content is about 80% in Comparative Example 1 whereas the water content in Example 3 is about 88%.

Thus, the highly water-absorptive optical material of the present invention has a high water content equal or superior to the conventional highly water-absorptive medical material, and has excellent mechanical strength.

TABLE 2

|  | Example No. | 1 | 2 | 3 | 4 | 5 | 6 | 7 | 8 | 9 | 10 | Comparative Example 1 |
|---|---|---|---|---|---|---|---|---|---|---|---|---|
| Proportions (parts by weight) | VAc (*1) | 86.5 | 90 | 92 | 90 | 90 | 90 | 89 | 86 | 90 | 90 | |
|  | Polymer (A) (Reference Example 1) | 13.5 | 10 | 8 | | | | | | | | |
|  | Polymer (A) (Reference Example 2) | | | | 10 | | | | | | | |
|  | Polymer (A) (Reference Example 3) | | | | | 10 | | | | | | |
|  | Polymer (A) (Reference Example 4) | | | | | | 10 | | | | | |
|  | Polymer (A) (Reference Example 5) | | | | | | | 11 | | | | |
|  | Polymer (A) (Reference Example 6) | | | | | | | | 14 | | | |
|  | Polymer (A) (Reference Example 7) | | | | | | | | | 10 | | |
|  | Polymer (A) (Reference Example 8) | | | | | | | | | | 10 | |
|  | DMAA (*2) | | | | | | | | | | | 55 |
|  | NVP (*3) | | | | | | | | | | | 19 |
|  | AIBN (*4) | 0.5 | 0.5 | 0.5 | 0.5 | 0.5 | 0.5 | 0.5 | 0.5 | 0.5 | 0.5 | (*5) 0.03 |
| Physical properties | Transparency upon absorption of water | CT | CT | CT | CT | CT | CT | CT | CT | CT | CT | CT |
|  | Boiling resistance | ND | ND | ND | ND | ND | ND | ND | ND | ND | ND | ND |
|  | Solvent resistance | ND | ND | ND | ND | ND | ND | ND | ND | ND | ND | ND |
|  | Water content (%) | 80.6 | 85.4 | 88.6 | 88.1 | 88.2 | 87.3 | 86.7 | 83.5 | 89.7 | 85.4 | 79.9 |
|  | Penetration resistance (g) | 236 | 210 | 118 | 97 | 134 | 169 | 171 | 267 | 98 | 191 | 122 |
|  | Elongation (%) | 102 | 160 | 161 | 108 | 154 | 162 | 107 | 148 | 129 | 152 | 69 |
|  | Strength index | 214 | 162 | 106 | 72 | 100 | 136 | 155 | 202 | 68 | 171 | 21.1 |

(g.%/μm)
Notes:
*1: Vinyl acetate
*2: Dimethyl acrylamide
*3: N-vinyl pyrrolidone
*4: Azobisisobutyronitrile
*5: Azobisdimethylvaleronitrile
CT: Colorless and transparent
ND: Not dissolved

COMPARATIVE EXAMPLE 1

26 Parts by weight of the polymer (A) prepared in Reference Example 1, 55 parts by weight of dimethyl acrylamide, 19 parts by weight of N-vinyl pyrrolidone and 0.03 part by weight of azobisdimethylvaleronitrile as a polymerization initiator, were mixed, and a test specimen film of a copolymer was obtained in the same manner as in Example 1. The physical properties of this The highly water-absorptive optical material of the present invention has the following features and effects.

(1) It is a highly water-absorptive material obtained by the saponification for hydrophilic treatment of a copolymer comprising a fatty acid vinyl ester as one of the main components, and therefore, the water content is usually at least about 80%. As compared with the conventional material comprising vinyl pyrrolidone or the like as the main component, it is possible to obtain a material having relatively high mechanical strength in a high water content region.

(2) The copolymer is prepared by using a (meth)acrylate polymer having at least one polymerizable group on an average (polymer (A)), and therefore, the reinforcing effect of the polymer (A) is adequately obtained, whereby a material having excellent durability such as mechanical strength, can be obtained.

Namely, the polymer (A) has a high molecular weight, and therefore it not only provides reinforcing effects due to the physical cross-linking such as the intertwining of the copolymer chains to one another, but when it contains at least two polymerizable groups, it forms chemical cross-linking with a copolymerizable monomer by a copolymerization reaction, whereby it is possible to improve the durability such as the dimensional stability, the boiling resistance and the solvent resistance of the material over the conventional material wherein a polymer having a polymerizable group only at one terminal end is used.

(3) The copolymerization reaction can be efficiently conducted since the type of the polymerizable groups in the polymer (A) is selected to be readily copolymerizable with the polymerizable group of the monomer for the copolymerization.

For example, the polymer (A) contains a vinyl-type polymerizable group such as an allyl group or a vinyl group, and therefore the copolymerization with a fatty acid vinyl ester as another main component can efficiently be conducted.

Consequently, when the material was permitted to absorb water, no macro phase-separation occurs in the material, whereby a transparent material will be obtained without bringing about white turbidity in the material.

Further, since the copolymerization is conducted satisfactory, the above-mentioned reinforcing effect or durability such as the mechanical strength, the dimensional stability, the boiling resistance and the solvent resistance, can adequately be obtained.

(4) The polymer (A) is obtained by the copolymerization of an alkyl (meth)acrylate monomer and a monomer having at least two polymerizable groups per molecule, as the main components, whereby the polymerization reaction operation for the preparation of the polymer (A) is not cumbersome, and the polymer (A) an be obtained efficiently as compared with living anion polymerization, and it is possible to produce the material in a large amount at low costs on an industrial scale.

(5) Polyvinyl alcohols and (meth)acrylate polymers obtained by saponifying copolymers of fatty acid vinyl esters, are generally excellent in the compatibility with living bodies, and thus suitable as materials for medical applications.

Thus, by virtue of the features and effects as summarized in the above items (1) to (4), the highly water-absorptive optical material of the present invention is useful as a highly water-absorptive material for medical applications, particularly as an optical material such as a contact lens material or as a material for artificial cornea.

We claim:

1. A highly water-absorptive optical material obtained by saponification for hydrophilic treatment of a copolymer composed essentially of:

(A) from 2 to 30 parts by weight of a (meth)acrylate polymer having at least one polymerizable group per molecule on an average obtained by copolymerizing (a) an alkyl (meth)acrylate monomer and (b) a monomer having at least two polymerizable groups per molecule, as the main components, and (B) from 70 to 98% by weight of a fatty acid vinyl ester.

2. The optical material according to claim 1, wherein the alkyl (meth)acrylate monomer (a) is at least one member selected from the group consisting of methyl (meth)acrylate, ethyl (meth)acrylate, propyl (meth)acrylate, butyl (meth)acrylate, pentyl (meth)acrylate, hexyl (meth)acrylate, dodecyl (meth)acrylate, cyclohexyl (meth)acrylate, trifluoroethyl (meth)acrylate and pentafluoropropyl (meth)acrylate.

3. The optical material according to claim 1, wherein the monomer (b) is at least one member selected from the group consisting of allyl (meth)acrylate, vinyl (meth)acrylate, ethylene glycol di(meth)acrylate, diethylene glycol di(meth)acrylate, triethylene glycol di(meth)acrylate and dipropylene glycol di(meth)acrylate.

4. The optical material according to claim 1, wherein the (meth)acrylate polymer (A) has (c) a hydrophilic group-containing (meth)acrylate monomer copolymerized with the monomers (a) and (b).

5. The optical material according to claim 4, wherein the (meth)acrylate monomer (c) has a hydrophilic group selected from the group consisting of an alkoxypolyalkylene glycol residue, an amido group, an N-substituted amido group, an amino group, an N-substituted amino group, a carboxyl group, a hydroxyl group and a polyalkylene glycol residue.

6. The optical material according to claim 1, wherein the (meth)acrylate polymer (A) is obtained by copolymerizing from 65 to 99.95 mol parts of the alkyl (meth)acrylate monomer (a), from 0.05 to 5 mol parts of the monomer (b) and from 0 to 30 mol parts of (c) a hydrophilic group-containing (meth)acrylate monomer.

7. The optical material according to claim 1, wherein the (meth)acrylate polymer (A) has a number average molecular weight of from about 5,000 to about 200,000.

8. The optical material according to claim 1, wherein the (meth)acrylate polymer (A) has a number average molecular weight of from 10,000 to 100,000 and contains from 1 to 5 polymerizable groups per molecule on an average.

9. The optical material according to claim 1, wherein the polymer (A) has the formula:

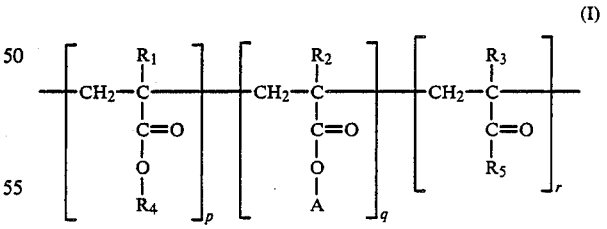

(I)

wherein each of $R_1$, $R_2$ and $R_3$ which may be the same or different, is a hydrogen atom or a methyl group, $R_4$ is an alkyl group, A is a polymerizable group selected from the group consisting of an allyl group, a vinyl group and a (meth)acryloyl group, $R_5$ is a hydrophilic group, and p, q and r are integers satisfying $0.002 \leq q/(p+q+r) \leq 0.05$ and $0 \leq r/(p+q+r) \leq 0.3$.

10. The optical material according to claim 1, wherein the fatty acid vinyl ester (B) is at least one member selected from the group consisting of vinyl formate, vinyl acetate, vinyl propionate, vinyl butyrate, vinyl stearate, vinyl monochloroacetate, vinyl trifluoroacetate and vinyl trichloroacetate.

11. The optical material according to claim 1, wherein a part of the monomer (B) is substituted by (C) at least one hydrophilic monomer selected from the group consisting of a polymerizable group-containing lactam, an alkoxypolyalkylene glycol mono(meth)acrylate, a (meth)acrylamide, an N-mono-substituted (meth)acrylamide, an N,N-disubstituted (meth)acrylamide, a (meth)acryloyloxyalkylamine, an N-mono-substituted (meth)acryloyloxyalkylamine, an N,N-disubstituted alkylamine, (meth)acrylic acid and a hydroxyl group-containing (meth)acrylate.

12. A contact lens made of the optical material as defined in claim 1.

* * * * *